United States Patent [19]

Shuster

[11] 4,218,717
[45] Aug. 19, 1980

[54] ELECTRIC CONTROL SYSTEM FOR MOTOR VEHICLE

[76] Inventor: Harry Shuster, 1430 Loma Vista Dr., Beverly Hills, Calif. 90210

[21] Appl. No.: 935,689

[22] Filed: Aug. 21, 1978

[51] Int. Cl.² .................. H02H 3/32; H02H 3/24; H02H 7/18
[52] U.S. Cl. .................. 361/79; 307/10 BP; 320/28; 320/32; 361/83; 361/92
[58] Field of Search .................. 361/79, 83, 92, 93, 361/94; 320/28, 32, 33, 34, 39, 40, 45, 47, 54, 48; 340/636, 660, 664, 661; 307/10 BP, 10 LS; 123/146.5 D

[56] References Cited

U.S. PATENT DOCUMENTS

| 2,790,841 | 4/1957 | Sekul et al. | 307/10 BP |
| 3,244,899 | 4/1966 | Merle | 307/10 BP |
| 3,294,987 | 12/1966 | Skrbina | 307/10 BP |
| 4,021,718 | 5/1977 | Konrad | 320/48 |

*Primary Examiner*—Patrick R. Salce

*Attorney, Agent, or Firm*—Keith D. Beecher

[57] ABSTRACT

An electric control system is provided for a motor vehicle which automatically disconnects electric loads from the battery of the vehicle when the vehicle is not in use, and in the event that the driver leaves the vehicle without turning off the headlights, radio, or other accessories. The control system is connected to the battery of the vehicle, as well as to the generator and to the ignition switch. The system senses excess current from the battery under conditions when the generator is not functioning and when the ignition is turned off. However, a particular current threshold is established, so the system will not respond to normal current drain, such as from electric clocks, and the like. Also, a predetermined time delay is built into the system, so that the headlights, and other accessories will not be turned off the moment the driver stops his vehicle and turns off the ignition. However, should the excess currents from the battery persist beyond a predetermined time interval, the control system operates to disconnect the battery, or at least to reduce its current drain below a particular level.

4 Claims, 1 Drawing Figure

ELECTRIC CONTROL SYSTEM FOR MOTOR VEHICLE

BACKGROUND

In most automobiles and other automotive vehicles in present-day use, many of the auxiliary current consuming devices are connected to the battery through independent circuits. Therefore, it is possible for the operator to leave the vehicle with, for example, the headlights, radio, or other accessories in an energized condition. This can produce a severe drain on the battery of the vehicle, and it is a common experience for a person to return to his automobile after such an occurrence and find the battery dead, or in a seriously low state of charge.

Control systems have been proposed in the past for automatically disconnecting the current consuming devices of an automobile from the battery. However, in some instances, these prior art systems have proven themselves to be complicated in their construction and awkward to install in the electrical system of existing motor vehicles. In other instances, it has been found that the prior art control systems of this type often operate at times when their operation is not desired.

For example, one known prior art control system automatically disconnects the current consuming devices whenever the driver leaves the driver's seat of the motor car. This, however, can prove awkward in situations where the driver wishes merely to step out of the car for a moment, to close his garage doors or to check some other item. At such times, he does not want his headlights, and other instrumentalities in the car to be turned off.

Another prior art control system automatically turns off the electrical system of the vehicle whenever the engine temperature drops below a particular level. This is a convenient system in that it provides an appreciable time lag before it operates, so that the operator can leave the vehicle for short intervals without the electrical accessories being de-energized. However, this type of prior art system is relatively expensive, and is difficult to install.

The control system of the present invention is so conceived, and its various components are so related, and they cooperate with one another in such a manner, that the control system operates only when it is wanted. As will be described, the system of the invention is constructed to sense when the ignition switch is off, and when the generator is inoperative, and it then functions to monitor the discharge current of the battery. If the discharge current is higher than what would normally be sufficient, for example, to run a clock or other continuously energized electric device in the car, the control system operates to turn off the electrical system of the motor car, or at least to reduce the current drain to a lower level. A timer is included in the control system of the invention, to provide a predetermined time delay before the system will operate, for the reasons explained above.

BRIEF DESCRIPTION OF THE DRAWING

The single FIGURE is a block diagram showing a control system constructed in accordance with the concepts of the present invention, and included in the electrical system of a motor vehicle.

DETAILED DESCRIPTION OF THE ILLUSTRATED EMBODIMENT

Figure 1:
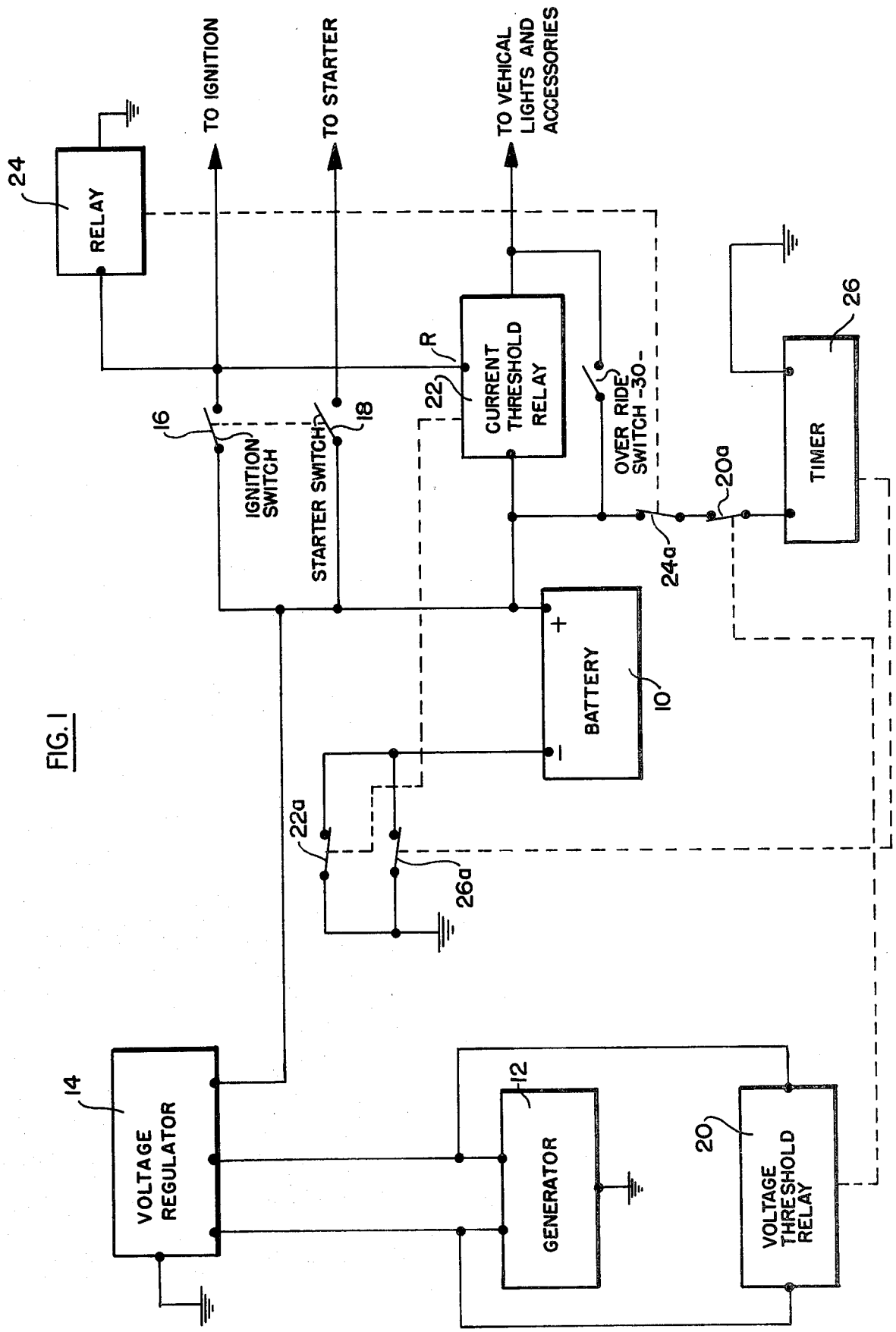

The electrical system of the motor vehicle, as shown in the drawing includes a usual battery 10 and generator 12, together with a usual voltage regulator 14 being interposed between the battery and the generator. The battery is connected through an ignition switch 16 to the ignition of the motor vehicle, and through a starter switch 18 to the starter of the motor vehicle. These switches are usually mechanically interconnected in present-day vehicles, so that the ignition switch is first closed, and further turning of the ignition key causes the starter switch to close and energize the starter.

The control system of the present invention includes a voltage threshold relay 20 which is connected across the generator 12, and which is de-energized whenever the output voltage from the generator drops below a selected value to indicate that the generator is not working.

The control system also includes a current threshold relay 22 which is connected in series between the positive terminal of the battery 10 and the various vehicle lights and other accessories. The current threshold relay 22 is energized whenever the current drawn from the battery 10 exceeds a certain minimum value indicating that accessories other than clocks, and the like, are being energized. The control system also includes a relay 24 which is energized only when the ignition switch 16 is closed.

Voltage threshold relay 20 operates a pair of normally closed contacts 20a, and relay 24 operates a pair of normally closed contacts 24a which are connected between the battery and a timer 26. The timer is energized by battery 10 whenever the contacts 24a and 20a are closed, and this condition occurs when the ignition switch 16 is open, and when generator 12 is not operating. After the timer 26 has been energized for a predetermined time, it opens a relay contact 26a which is connected to the negative terminal of battery 10. Current threshold relay 22 opens a second pair of relay contacts 22a connected to the negative terminal of battery 10, when the current through the relay exceeds the particular minimum value. An override switch 30 is provided across relay 22.

When the driver of the car stops the vehicle, the generator 12 no longer operates to generate electricity, and the voltage threshold relay 20 is de-energized to close relay contacts 20a. Also, when the driver opens the ignition switch 16 and removes his key, relay 24 is de-energized so that relay contacts 24a close. Timer 26 is now energized, and after a predetermined time, it opens the relay contacts 26a.

However, the battery continues to supply power to the vehicle lights and accessories, unless the power so supplied is in excess of a predetermined threshold. Should that occur, current threshold relay 22 opens relay contacts 22a, so that battery 10 is disconnected. The current threshold relay 22 does not automatically reset itself after the battery 10 has been disconnected, and a low current drain holding circuit is established in the relay to maintain contact 22a open, until the relay is reset by the subsequent closure of the ignition switch 16.

The invention provides, therefore, an improved and simple control system which operates only when it is needed, and which prevents the battery of the motor vehicle from being drained due to the driver inadvertently leaving the headlights, or other accessories of the vehicle energized when the vehicle is not in use.

It will be appreciated that although a particular embodiment of the invention has been shown and described, modifications may be made. It is intended in the claims to cover the modifications which come within the true spirit and scope of the invention.

What is claimed is:

1. An electrical control system for connection into the electrical system of an automotive vehicle for controlling the connection between a source of electrical energy and at least one electrical energy consuming device in the vehicle, the electrical system of the vehicle including a battery and a generator together constituting said source of electrical energy, said electrical energy consuming device drawing excessive electric current from said source sufficient to discharge the battery when the generator is inoperative, and an ingnition switch for connecting said source to the ignition system of the vehicle; said control system including; a current sensative relay connected between said source and said electrical energy consuming device; a voltage sensitive relay connected across said generator; relay circuitry controlled by said current sensitive relay and by said voltage sensitive relay to terminate the excessive current flow to the energy consuming device in the event fthe current flow through the current sensitive relay exceeds a predetermined current threshold and when the voltage across the generator drops below a predetermined voltage threshold; a further relay connected to the ignition switch and having contacts connected in said relay circuitry for rendering said relay circuitry active only when the ignition switch is open; and timer means connected to said relay circuitry to render said relay circuitry effective only after a predetermined time interval.

2. The electrical control system defined in claim 1, in which said relay circuitry serves to disconnect the battery when the current flow through the current sensitive relay exceeds said predetermined current threshold and when the voltage across the generator drops below said predetermined voltage threshold.

3. The electrical control system defined in claim 1, and which includes a manually operated override switch connected to said relay circuitry to render said circuitry ineffective when the switch is operated.

4. The electrical control system defined in claim 3, in which said manually operated override switch is connected across said current sensitive relay.

* * * * *